United States Patent [19]

Lew et al.

[11] Patent Number: 5,419,189
[45] Date of Patent: May 30, 1995

[54] METHOD FOR OBTAINING ZERO FLOWMETER READING FOR ZERO FLOW

[76] Inventors: Hyok S. Lew; Yon S. Lew; Hyon S. Lew, all of 7890 Oak St., Arvada, Colo. 80005

[21] Appl. No.: 164,925
[22] Filed: Dec. 10, 1993

Related U.S. Application Data

[63] Continuation-in-part of Ser. No. 113,197, Aug. 30, 1993, Pat. No. 5,351,556.

[51] Int. Cl.6 .......................... G01F 15/00; G01F 1/32
[52] U.S. Cl. ........................................ 73/195; 73/198; 73/861.22
[58] Field of Search ................. 73/861.22, 861.24, 195, 73/196, 198

[56] References Cited

U.S. PATENT DOCUMENTS 4,270,391 6/1981 Herzl .................................. 73/861.22
5,020,373 6/1991 Kamiunten et al. ............... 73/195 X
5,228,327 7/1993 Bruck ............................ 73/861.37 X

FOREIGN PATENT DOCUMENTS

0006723 1/1989 Japan .
2177204 1/1987 United Kingdom .

*Primary Examiner*—Herbert Goldstein

[57] ABSTRACT

A flowmeter comprises an output cut-off circuit controlled by a command signal generated by a flow switch, wherein the flow switch generates a command signal switching on the transmission of an electrical signal representing the flow rate of media to an output terminal, when the flow rate of media being measured by the flowmeter is greater than a preset threshold value, and switches off the transmission of the electrical signal representing the flow rate of media to the output terminal, when the flow rate of media is less than the preset threshold value.

3 Claims, 4 Drawing Sheets

METHOD FOR OBTAINING ZERO FLOWMETER READING FOR ZERO FLOW

This is a continuation-in-part Application to patent application Ser. No. 08/113,197 entitled "Compound Electronic Filter for Vortex Shedding Flowmeter" filed on Aug 30, 1993, now U.S. Pat. No. 5,351,556.

FIELD OF THE INVENTION

This invention relates to a method for obtaining zero read-out from a flowmeter, when the flow rate of media being measured by the flowmeter is equal to zero.

BACKGROUND OF INVENTION

The combination of the advanced concept electromechanical flow sensors and the intelligent electronic data processors brought forth to practice in the field of flow measurement technology in recent times by a number of educated inventors and intellectual engineers, has precipitated to a number of different types of flowmeters having an extraordinary capability of measuring very low flow rates of fluid media as well as measuring flow rates of media over wide flow ranges wherein the ratio between the maximum and minimum measurable velocity approaches or exceeds one hundred to one. Such super flowmeters in general employ advanced concept electronic filters automatically tracking and locking on the flow-generated signal in a continuous or stepwise manner, wherein the electronic filter selectively transmits the flow-generated signal and blocks off the noise signal. However, when the flow rate of fluid media becomes zero or is very low, there is no flow-generated signal that controls the tracking and locking of the electronic filter on the flow-generated signal. As a consequence, the electronic filter loses its ability to block off the noise signal, and the noise signal transmitted through the electronic filter produces a nonzero readout from the flowmeter when the actual flow rate is equal to zero. It is a common wisdom that a dishonest smart person is no more useful to society than a honest dumb person. Likewise, a highly sensitive flowmeter providing a false nonzero read-out when the actual flow rate is equal to zero, is no more useful than a less sensitive flowmeter providing the zero read-out when the actual flow rate is equal to zero.

BRIEF SUMMARY OF INVENTION

The primary object of the present invention is to provide a flowmeter such as a vortex shedding flowmeter, turbine or paddle flowmeter, Coriolis force or inertia force flowmeter, magnetic flowmeter, sonic or ultrasonic flowmeter, differential pressure flowmeter, orifice or venturi flowmeter, or a thermal mass flowmeter, including a flow activated out-put cut-off switch that turns on the transmission of the flow-generated signal to an out-put terminal when the flow rate of media being measured by the flowmeter is greater than zero or a preset threshold value, and turns off the transmission of the flow-generated signal to the out-put terminal when the flow rate of media is equal to zero or less than the preset threshold value.

Another object is to provide a vortex shedding flowmeter including the flow activated out-put switch that switches on the transmission of a vortex-generated electrical signal to the out-put terminal when the flow rate of media being measured by the vortex shedding flowmeter is greater than zero or a preset threshold value, and switches off the transmission of the vortex-generated electrical signal to the out-put terminal when the flow rate of media is equal to zero or less than the preset threshold value.

A further object is to provide a turbine or paddle wheel flowmeter including a flow activated out-put switch that switches on the transmission of an electrical signal generated by the rotating motion of the turbine or paddle wheel included in the turbine or paddle wheel flowmeter when the flow rate of media being measured by the turbine or paddle wheel flowmeter is greater than zero or a preset threshold value, and switches off the transmission of the electrical signal when the flow rate of media is equal to or less than the preset threshold value.

These and other objects of the invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
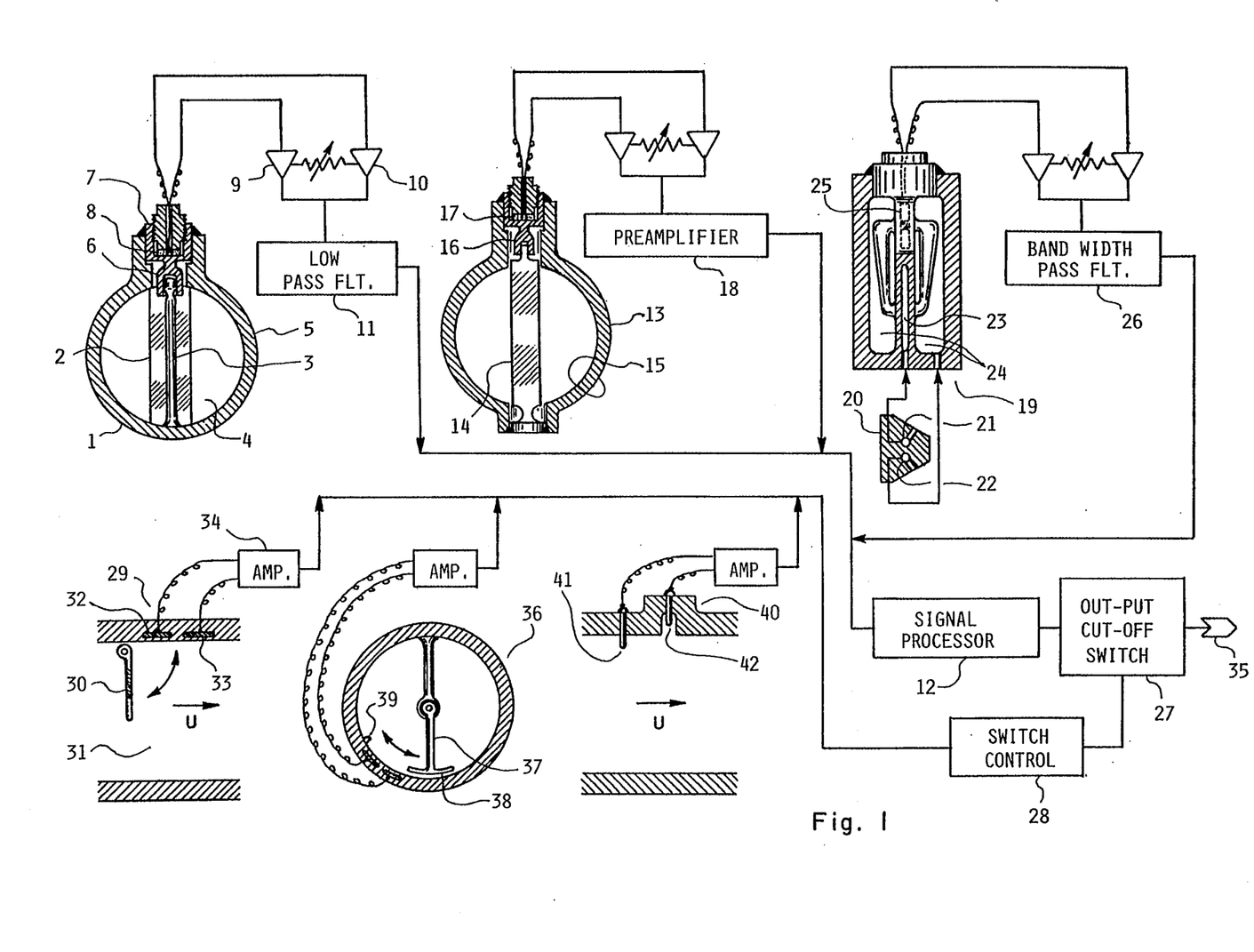
FIG. 1 illustrates various embodiments of the vortex flowmeters employing various embodiments of the flow activated out-put cut-off switches, which switch on and off the transmission of an alternating electrical signal generated by the vortex shedding occurring in the vortex flowmeters.
Figure 2:
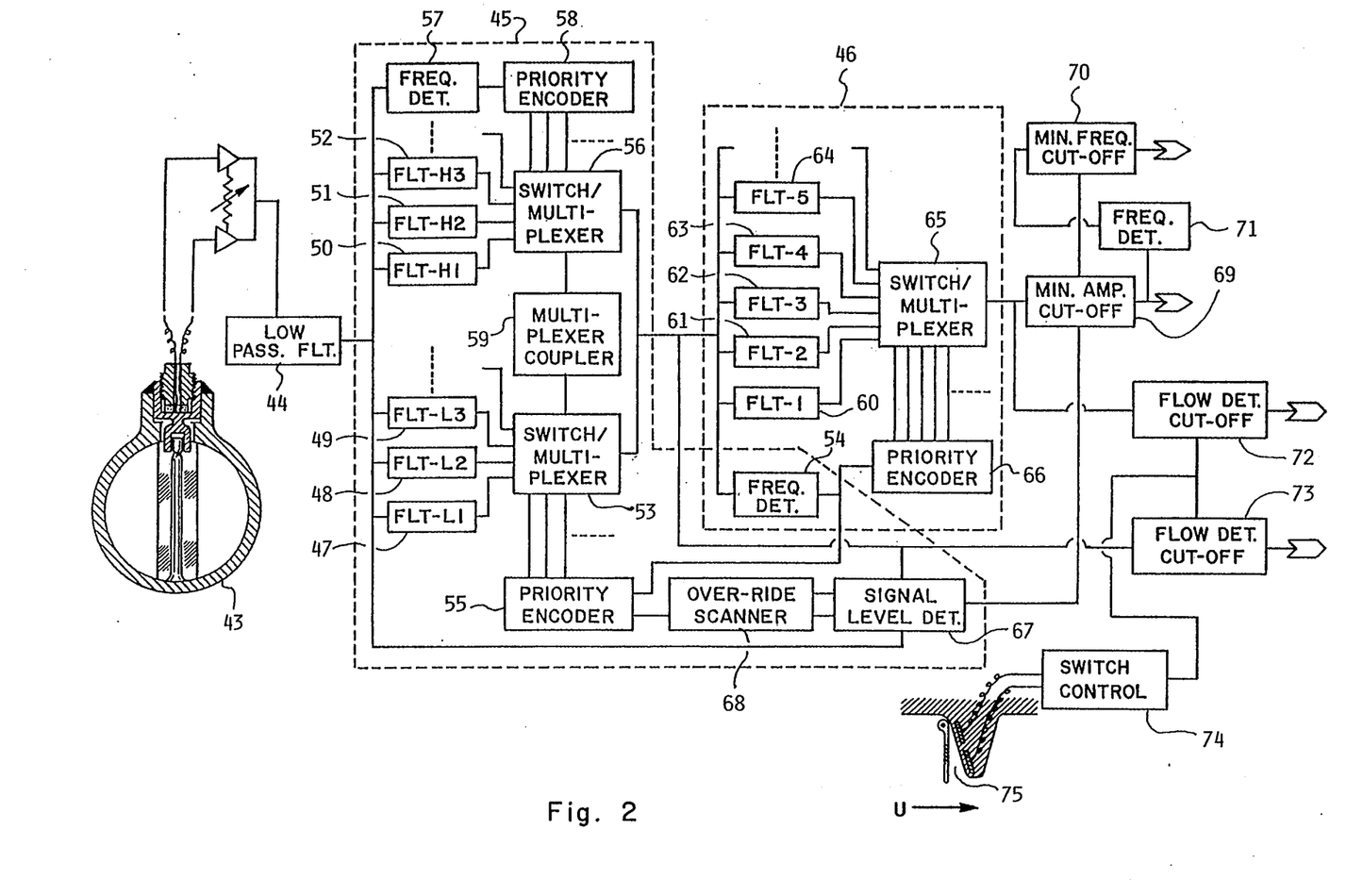
FIG. 2 illustrates an embodiment of an electronic filter with the flow activated out-put cut-off switch, that transmits the vortex-generated electrical signal only.

In FIG. 1 there is illustrated various embodiments of the vortex shedding flowmeters, which employ various types of the flow activated out-put cut-off switch switching on and off the transmission of the vortex-generated electrical signal to an out-put terminal. The first type 1 of the vortex flowmeter comprises a vortex generating bluff body 2 of an elongated cylindrical shape and a vortex sensing planar member 3 disposed downstream of the vortex generating bluff body 2 on a plane parallel to the longitudinal axis of the vortex generating bluff body 2 and the center line of the flow passage 4, wherein at least one extremity of the vortex sensing planar member 3 is secured to the flowmeter body 5, while a deflective portion of the vortex sensing planar member 3 such as the other extremity of the vortex sensing planar member 3 disposed in an overhanging structural arrangement or resiliently supported by the flowmeter body 5, is connected to a force transmitting member 6 extending from the transducer assembly 7 that contains a transducer element 8 converting the alternating mechanical stress or strain received by the force transmitting member 6 from the vortex sensing planar member 3 to an alternating electrical signal having the same frequency as the frequency of vortex shedding from the vortex generating bluff body 2. The alternating electrical signal generated by the transducer element 8 may be preconditioned by a pair of summing or differential amplifiers 9 and 10, and a low pass or band pass filter 11. The preconditioned vortex-generated alternating electrical signal is supplied to an electronic signal processor or filter 12 that further refines the alternating electrical signal and converts it into a preferred form that represents the fluid velocity U or volume flow rate of media being measured by the vortex flowmeter 1. The second type 13 of the vortex flowmeter comprises a vortex generating bluff body 14 that also functions as a vortex sensor, wherein at least one extremity of the vortex generator-sensor 14 is secured to the flowmeter body 15, while a deflective portion of the vortex generator-sensor 14 such as the other extremity thereof disposed in an over-hanging structural arrangement or resiliently supported by the flowmeter body 15 is mechanically connected to the force transmitting member 16 extending from the transducer container vessel housing a transducer element 17. The vortex-generated alternating electrical signal may be preconditioned by a pair of summing or differential amplifiers and a preamplifier 18. The preconditioned alternating electrical signal representing the vortex shedding is supplied to the electronic signal processor 12. The third type 19 of the vortex flowmeter comprises a vortex generating bluff body 20 including a pair of pressure communicating holes 21 and 22 transmitting the fluid pressures respectively existing at the two opposite cylindrical side surfaces of the vortex generating bluff body 20 to two pressure compartments 23 and 24, respectively. The transducer element 25 converts the alternating differential pressure between the two pressure compartments 23 and 24 to an alternating electrical signal that is preconditioned by a pair of summing or differential amplifiers and a band pass or low pass filter 26 and supplied to the electronic signal processor 12. The alternating electrical signal put into a preferred form representing the fluid velocity U or flow rate of media is supplied to an out-put terminal through an out-put switch 27 controlled by a switch control 28 receiving the command signal from a flow activated switch. The first embodiment 29 of the flow switch comprises a flap 30 pivotally suspended from the wall of a flow passage 31, and a pair of capacitor plates or patches 32 and 33 included in the wall of the flow passage 31 in a relationship wherein the flap 30 becomes pivoted to a superimposing position establishing a close proximity relationship with the pair of capacitor plates 32 and 33, when the flow of media exerts a drag force on the flap 30. When the fluid velocity U or flow rate is less than a preset threshold value, the weight of the flap 30 keeps the flap 30 at the vertically suspended position and, consequently, very little command signal in the form of a high frequency alternating electric current is transmitted across the pair of capacitor plates 32 and 33. As a consequence, the command signal amplifier 34 does not supply a command signal to the switch control 28, that switches on the transmission of the vortex-generated signal from the electronic signal processor 12 to an out-put terminal 35 as long as the fluid velocity U or flow rate of media being measured by the vortex flowmeter is less than the preset threshold value. Therefore, the read-out of the vortex flowmeter taken from the out-put terminal 35 registers zero value as long as the fluid velocity U or flow rate of media is less than the preset threshold value. When the fluid velocity U or flow rate of media exceeds the preset threshold value, the drag force exerted by the fluid flow and experienced by the flap 30 pivots the flap 30 to a position establishing a close proximity relationship with the pair of capacitor plates 32 and 33 and, consequently, the command signal in the form of a high frequency alternating electric current having a source in the command signal amplifier 34 becomes transmitted across the pair of capacitor plates 32 and 33. As a consequence, the command signal amplifier 34 supplies a command signal to the switch control 28, that switches on the transmission of the vortex-generated signal from the electronic signal processor 12 to the out-put terminal 35. In general, a flow data processing or interfacing device is connected to the out-put terminal 35. The flow activated switch 29 generating the command signal is particularly suited for cutting off the out-put from the flowmeter, when the fluid velocity U or flow rate of media is less than a preset threshold value having a moderately low magnitude. The flow activated switch 36 or the flow activated switch 75 included in the embodiment shown in FIG. 2 is particularly suited for cutting off the out-put from the flowmeter, when the fluid velocity U or flow rate is less than a preset threshold value having a very low magnitude. The second embodiment 36 of the flow activated switch generating the command signal operates on the same principles as those of the corresponding device 29 described in the preceding paragraphs. This particular embodiment of the flow activated switch comprises a fluid dynamic blade 37 having an airfoil shaped cross section, that is pivotally supported by a pylon about a pivot axis parallel to the direction of the fluid flow. The weight of the capacitor plate 38 secured to the unsecured extremity of the fluid dynamic blade 37 stays at the "off" position as long .as the lift force on the fluid dynamic blade 37 is not large enough to rotate the fluid dynamic blade 37 to a rotated position whereat the capacitor plate 38 establishes contact with a stop 39. In other words, the flow activated switch 36 stays open and the transmission of the flow-generated signal to the out-put terminal 35 remains cut off as long as the fluid velocity U or flow rate of media being measured by the flowmeter is less than a preset threshold value. The fluid dynamic lift force rotates the fluid dynamic blade 37 to the rotated position whereat the capacitor plate 38 is stopped by the stop 39 and, consequently, the transmission of the flow-generated signal to the out-put terminal 35 becomes switched on, when the fluid velocity U or flow rate of media is greater than the preset threshold value. The third embodiment 40 of the flow activated switch generating the command signal comprises a first temperature probe 41 fully exposed to the fluid flow, and a second temperature probe 42 partially exposed to or shielded from the fluid flow. When the fluid velocity U or flow rate of media is less than a preset threshold value, the temperature difference between the two temperature probes 41 and 42 is less than a preset reference value, below which preset reference value of the temperature difference the command signal switching on the transmission of the flow-generated signal is not produced by the command signal amplifier. When the fluid velocity U or flow rate of media is greater than the preset threshold value, the temperature difference between the two temperature probes 41 and 42 becomes greater than the preset reference value, and the command signal amplifier produces a command signal that switches on the transmission of the flow-generated signal from the electronic signal processor 12 to the output terminal 35. In an alternative design, the second temperature probe 42 may be disposed immediately downstream of the first temperature probe 41 in a fully exposed arrangement to the fluid flow. It is well known fact among those skilled in the art a flow activated switch generating the command signal can be constructed by using the same principles as those of the proximity switches operating on an electrostatic, inductive, capacitive, conductive, or photoelectric principles. Therefore, the out-put cut-off switch employed in the present invention to control the switching on and off of the transmission of the flow-generated signal may use a flow activated switch operating on the principles of one of the afore-mentioned proximity switches.

In FIG. 2 there is illustrated an embodiment of the electronic filter or electronic signal processing device including a flow activated out-put cut-off switch, that operates on the principles described in conjunction with FIG. 1. This particular electronic signal processing device comprises a compound electronic filter, and is suitable to condition and refine a flow-generated alternating electrical signal such as an alternating electrical signal generated by the vortex shedding occurring in a vortex flowmeter or by the rotation of a turbine or paddle wheel included in a turbine or paddle wheel flowmeter. This version of the compound electronic filter includes not only the absolutely necessary circuit elements required to condition and refine the flow-generated alternating electrical signal but also the accessorial circuit elements complementing the conditioning and refining of the flow-generated alternating electrical signal. The alternating electrical signal generated by a vortex flowmeter such as the particular embodiment 43 comprising a vortex generating bluff body disposed across an upstream cross section of a flow passage and a vortex sensing planar member disposed across a downstream cross section of the flow passage, or other types of the vortex flowmeters or a turbine or paddle wheel flowmeter, is preconditioned by a low pass or band pass filter 44 before being put into the compound electronic filter comprising a first stage filter 45 and a second stage filter 46. The preconditioning by the low pass or band pass filter 44 gets rid of noise signals with frequencies distributed outside of the vortex shedding frequency range. The first stage filter 45 comprises a parallel combination of a plurality of low frequency band pass filters 47, 48, 49, etc. wherein the lowest frequency band pass filter 47 may be a low pass filter, and a plurality of high frequency band pass filters 50, 51, 52, etc. wherein the highest frequency band pass filter may be a high pass filter. This combination of the low and high frequency band pass filters covers the entire range of the vortex shedding frequency range as the band width of each individual band pass filter extends into the band widths of adjacent individual band pass filter or filters in a sharply decaying manner. A switch/multiplexer 53 switches on and off the individual low frequency band pass filters 47, 48, 49, etc. as directed by a command signal generated from the frequency of the alternating electrical signal measured at the output end of the first stage filter 45 by a frequency detector 54. A priority encoder 55 receives the information on the frequency of the alternating electrical signal detected by the frequency detector 54 in the form of a dc voltage and sends the command signal controlling the switching of the low frequency band pass filters 47, 48, 49, etc. to the switch/multiplexer 53. The priority encoder 55 has a plurality of threshold voltages respectively corresponding to a plurality of threshold frequencies respectively assigned to a plurality of switches included in the switch/multiplexer 53, which plurality of switches respectively switch on and off the plurality of low frequency band pass filters 47, 48, 49, etc. When the command dc voltage generated by the frequency detector 54 and sent to the priority encoder 55 is equal to or greater than a threshold voltage assigned to a particular individual low frequency band pass filter and less than a threshold voltage assigned to the adjacent higher frequency low frequency band pass filter, the particular low frequency band pass filter becomes switched on and stays switched on as long as the command dc voltage remains within the above-mentioned range, whereby the alternating electrical signal with frequencies distributed within the band width of the particular low frequency band pass filter is selectively transmitted through the particular low frequency band pass filter, of which band width includes the threshold frequency corresponding to the threshold voltage assigned to the particular low frequency band pass filter. As a consequence, the lowest frequency band pass filter 47 becomes switched on when the command dc voltage generated by the frequency detector 54 is equal to or greater than the threshold voltage assigned thereto or zero and less than the threshold voltage assigned to the second lowest low frequency band pass filter, and the second lowest low frequency band pass filter becomes switched on when the command dc voltage is equal to or greater than the threshold voltage assigned thereto and less than the threshold voltage assigned to the third lowest low frequency band pass filter, and so on. It must be mentioned that the priority encoder 54 switches on only one individual low frequency band pass filter at one time and switches off all of the remaining individual low frequency band pass filters, and that the lowest low frequency band pass filter stays normally switched on when there is no command dc voltage generated by the frequency detector 54 because of the absence of a frequency of any detectable level. The values of the threshold voltages are assigned to the various individual low frequency band pass filters 47, 48, 49, etc. in such a way that the threshold frequency corresponding to each threshold voltage assigned to a particular low frequency band pass filter is within the band width of the particular low frequency band pass filter, whereby an individual low frequency band pass filter switched on selectively transmits a component of the alternating electrical signal having frequencies distributed within the band width of the switched on individual low frequency band pass filter and blocks off all other components of the alternating electrical signal with frequencies distributed outside of the band width of the switched on individual low frequency band pass filter. The plurality of high frequency band pass filters 50, 51, 52, etc. are switched on and off one at a time by a switch/multiplexer 56 receiving a command dc voltage generated by the frequency of the alternating electrical signal measured at the input end of the first stage filter 45 by a frequency detector 57, which command dc voltage is processed by a priority encoder 58. The switching on and off of the high frequency band pass filters 50, 51, 52, etc. is controlled by the same method as that controls the switching of the low frequency band pass filters 47, 48, 49, etc. with one exception being that the command dc voltage controlling the high frequency band pass filters 51, 52, 53, etc. is generated from the frequency of the alternating electrical signal detected at the input end of the first stage filter 45, while the command dc voltage controlling the low frequency band pass filters 47, 48, 49, etc. is generated from the frequency of the alternating electrical signal detected at the output end of the first stage filter 45. The multiplexer coupler 59 performs a function that ensures only one individual band pass filter among the low and high frequency band pass filters 47, 48, 49, 50, 51, 52, etc. is switched on at one time and all of the remaining individual band pass filters are switched off. It should be underscored that the band width of each individual band pass filter included in the first stage filter 45 or in the second stage filter 46 extends beyond the range bounded by two threshold frequencies respectively corresponding to two threshold voltages defining the switch-on range of the particular individual band pass filter and, consequently, the entire range of the vortex shedding frequency is continuously covered by the band widths of the individual band pass filters constituting the compound electronic filter in a partially over-lapping relationship between each pair of adjacent band widths.

The second stage filter 46 included in the compound electronic filter shown in FIG. 2 comprises a plurality of parallel band pass filters 60, 61, 62, 63, 64, etc., which are switched on and off one at a time by a switch/multiplexer 65 that receives a command dc voltage generated from the frequency of the alternating electrical signal measured at the output end of the first stage filter 45 and at the input end of the second stage filter 46 by the frequency detector 54, wherein the command dc voltage is processed by a priority encoder 66 in the same manner as that controlling the switching of the low frequency band pass filters 47, 48, 49, etc. As a matter of fact, the combination of band pass filters 60, 61, 62, 63, 64, etc. and the combination of the low frequency band pass filters 47, 48, 49, etc. are controlled by the same method, as the two command dc voltages respectively controlling the two combinations of the band pass filters are generated from the same frequency detector 54 detecting the frequency of the alternating electrical signal at a junction of the signal flow intermediate the first stage filter 45 and the second stage filter 46. The band widths of each individual band pass filter included in the second stage filter 46 extends beyond the range bounded by two threshold frequencies respectively corresponding to two threshold voltages defining the switch-on range of the particular individual band pass filter and, consequently, the entire range of the vortex shedding frequency is continuously covered by the band widths of the individual band pass filters constituting the second stage filter 46 in a partially over-lapping relationship between each pair of adjacent band widths.

The single most important feature of the compound electronic filter comprising the first stage filter 45 and the second stage filter 46 is that the command dc voltage controlling the low frequency band pass filters 47, 48, 49, etc. included in the first stage filter 45 is generated from the frequency of the alternating electrical signal measured at the output end of the first stage filter 45, while the command dc voltage controlling the band pass filters 60, 61 62, 63, 64, etc. included in the second stage filter 46 is generated from the frequency of the alternating electrical signal measured at the input end of the second stage filter 46. In other words, the parallel combination of the low frequency band pass filters 47, 48, 49, etc. included in the first stage filter 45 and the parallel combination of the band pass filters 60, 61, 62, 63, 64, etc. included in the second stage filter 46 are controlled by the same frequency of the alternating electrical signal detected at a junction of the signal flow intermediate the first stage filter 45 and the second stage filter 46. It should be understood that, in general, it is very difficult to accurately measure the vortex shedding frequency when the fluid velocity is very low, e.g., air flow under the standard condition lower than 6 feet per second or 2 meter per second, and water flow lower than 0.6 feet per second or 0.2 meter per second, without conditioning the vortex-generated alternating electrical signal by using a low frequency band pass or low pass filter with a narrow band width, because the noise signal created by mechanical vibrations of the vortex flowmeter and entrained in the vortex-generated alternating electrical signal has frequencies higher than the vortex shedding frequencies of low values, and causes the frequency detector to measure the high frequency of the noise signal instead of the low frequency of the vortex shedding. As a consequence, when the command dc voltage generated by the frequency of the alternating electrical signal detected at the input end of a parallel filter bank is used to control the individual filters constituting the parallel filter bank, a wrong individual filter with a band width including the high frequency of the noise signal becomes switched on instead of an individual filter with a band width including the low frequency of the vortex shedding. When the parallel filter bank is controlled by a command dc voltage generated from the frequency of the alternating electrical signal measured at the output end of the parallel filter bank, a wrong individual filter switched on by a high frequency of the vortex shedding or by a noise signal tends to remain switched on even after the vortex shedding frequency changes from the high value to a low value. Therefore, a parallel filter bank controlled indiscriminately by a command dc voltage generated exclusively from a common frequency of the alternating electrical signal measured only at the input end or only at the output end of the parallel filter bank does not work in general. The command dc voltage controlling the parallel filter bank cannot be generated from the amplitude of the alternating electrical signal, that fluctuates wildly at low fluid velocities due to the interference between the vortex-generated electrical signal and the noise signal having the comparable amplitude therebetween. The particular embodiment of the compound electronic filter shown in FIG. 2 teaches a unique and ingenious solution to the aforementioned problems by providing a first stage filter 45 comprising the parallel combination of the plurality of low frequency band pass filters 47, 48, 49, etc. controlled by a command signal generated by the frequency of the alternating electrical signal filtered by the first stage filter 45, and the combination of the plurality of high frequency band pass filters 50, 51, 52, etc. controlled by a command signal generated from the frequency of the alternating electrical signal unfiltered by the first stage filter 45, and by providing the second stage filter 46 comprising a plurality of parallel band pass filters 60, 61, 62, 63, 64, etc. commonly controlled by a command signal generated from the frequency of the alternating electrical signal filtered by the first stage filter 45 and unfiltered by the second stage filter 46. The parallel combination of the band pass filters 60, 61, 62, 63, 64, etc. included in the second stage filter 46 can be controlled by a command signal generated from the frequency of the alternating electrical signal commonly detected at the input end of the second stage filter 46, because the alternating electrical signal filtered by the first stage filter 45 is clean enough to provide the information on the vortex shedding frequency with an acceptable degree of accuracy. It should be understood that, in a high frequency range, the vortex-generated signal is overwhelmingly larger than the noise signal and, consequently, the vortex shedding frequency can be taken from the unfiltered alternating electrical signal with an acceptable degree of accuracy in generating the command signal therefrom to control the high frequency band pass filters 50, 51, 52, etc., while the vortex shedding frequency has to be taken from the alternating electrical signal filtered by the first stage filter 45 in generating the command signal therefrom to control the low frequency band pass filters 47, 48, 49, etc. in a low frequency range wherein the amplitudes of the vortex-generated signal and the noise signal are comparable to one another and the frequency of unfiltered alternating electrical signal is much greater than the frequency of the filtered signal approximately equal to the vortex shedding frequency. The particular method for controlling the first stage filter 45 and the second stage filter 46 works because of the following reasons: Firstly, only one of the individual band pass filters included in each of the first and second stage filters is switched on at one time and all of the remaining individual band pass filters are switched off. Secondly, the lowest frequency band pass filter included in each of the first and second stage filters is normally switched on when there is no command dc voltage because of the absence of a frequency of the alternating electrical signal due to an insufficient magnitude thereof. It is generally required that the transmitting efficiency of each of the low frequency band pass filters 47, 48, 49, etc. must decay rapidly enough in a frequency range outside of the band width of each individual low frequency band pass filter and yet must remain at finitely small and nonzero values in the frequency range covered by the parallel combination of the low frequency band pass filters 47, 48, 49, etc., when the first stage filter 45 does not have an over-ride control system comprising a signal level detector 67 and an over-ride scanner 68, whereby the vortex-generated signal occurring at a frequency within a low frequency range covered by the combination of the low frequency band pass filters 47, 48, 49, etc. becomes transmitted through the first stage filter 45 at least at a detectable level at all instants so that the frequency of the alternating electrical signal transmitted through the first stage filter 45 can be detected by the frequency detector 54 at all instants. In an alternative design wherein the transmitting efficiency of each of the individual low frequency band pass filters 47, 48, 49, etc. decays sharply to very small values or zero outside the band width of the each individual low frequency band pass filter, an over-ride control system comprising a signal level detector 67 and an over-ride scanner 68 is employed in order to ensure that the switching on and off of the low frequency band pass filters 47, 48, 49, etc. is executed in the mode tracking the varying fluid velocity. The over-ride control system automatically take over the switching on and off of the low frequency band pass filters 47, 48, 49, etc. when the level of the input alternating electrical signal to the first stage filter 45 is greater than a preset minimum value and the level of the output alternating electrical signal from the first stage filter 45 is less than a preset minimum value, which condition is detected by the signal level detector 67, whereupon the over-ride scanner 68 puts out a series of ramp dc voltage starting with zero value and ending with a maximum value equal to or greater than the largest threshold voltage assigned to the highest frequency low frequency band pass filter. The priority encoder 55 receiving the ramp dc voltage from the over-ride scanner 68 successively switches on and off the individual low frequency band pass filters 47, 48, 49, etc. one at a time starting with the lowest frequency low frequency band pass filter and ending with the highest frequency low frequency band pass filter, which switching in the sweep or scanning mode is repeated until the signal level detector 67 detects the output alternating electrical signal from the first stage filter 45 having a signal level equal to or greater than the preset minimum value. As soon as the signal level of the output alternating electrical signal from the first stage filter 45 greater than the preset minimum value is detected, the over-ride control system generating the ramp dc voltage is shut off automatically, and the regular control system providing the command dc voltage generated from the frequency of the alternating electrical signal measured at the output end of the first stage filter 45 takes over. The control of the high frequency band pass filters 50, 51, 52, etc. included in the first stage filter 45 as well as the control of the band pass filters 60, 61, 62, 63, 64, etc. included in the second stage filter 46 does not require an over-ride control system, as the command dc voltage generated from the frequency of the alternating electrical signal taken at the input end of the respective parallel filter bank reliably tracks the varying fluid velocity because the vortex-generated alternating electrical signal is overwhelmingly larger than the noise signal in the alternating electrical signal taken off from the input end of the respective parallel filter bank and the frequency thereof is generally equal to the frequency of the vortex shedding.

The compound electronic filter shown in FIG. 2 works best when the first stage filter 45 comprises a small number of band pass filters respectively having broad band widths, while the second stage filter 46 comprises a sizable number of band pass filters respectively having narrow band widths. In a modified version of the compound electronic filter shown in FIG. 2, the high frequency band pass filters 50, 51, 52, etc. may be omitted from the first stage filter 45, wherein the entire range of the vortex shedding frequency is now covered by the low frequency band pass filters 47, 48, 49, etc. as exemplified by the embodiment of the compound electronic filter shown in FIG. 3. In another modified version of the compound electronic filter shown in FIG. 2, the second stage filter 46 may be omitted, wherein the first stage filter 45 comprises the plurality of band pass filters 47, 48, 49, 50, 51, 52, etc. now having narrow band widths, respectively. In an application encountering only low level mechanical vibrations, the first stage filter 45 may be omitted from the compound electronic filter shown in FIG. 2. In order to prevent a vortex flowmeter from registering a false value of the low fluid velocity in a range of low fluid velocities wherein the noise signal is greater than the vortex signal, a minimum amplitude output cut-off circuit 69 may be included at the output end of the compound electronic filter, which automatically cut off the output signal from the compound electronic filter, when the level of the input signal to or the level of the output signal from the second stage filter 46 falls below a preset minimum value, below which preset minimum value, the vortex signal and the noise signal become indistinguishable from one another. The preset minimum value of the alternating electrical signal measured by the signal level detector 67, that defines the minimum measurable fluid velocity, may be made adjustable in the field in accordance with the noise level actually existing in the specific working environment. A minimum frequency output cut-off circuit 70 may be also included in series with the minimum amplitude output cut-off circuit 69 or independently at the output end of the compound electronic filter, which minimum frequency output cut-off circuit 70 cuts off the output signal from the compound electronic filter, when the frequency of the output signal measured by a frequency detector 71 falls below a preset minimum value that may be made adjustable in the field in accordance with the actual noise level existing in the specific working environment. It should be understood that the minimum amplitude or minimum frequency output cut-off circuit 69 or 70 are accessory elements, which are not essential components of the compound electronic filter.

In place of the minimum amplitude or minimum frequency output cut-off circuit 69 or 70, a flow activated output cut-off circuit 72 or 73 operating on the same principles as those described in conjunction with FIG. 1 may be included at the output end of the compound electronic filter, wherein the flow activated output cut-off circuit 72 disposed at the output end of the compound electronic filter comprising the first and second stage filters 45 and 46, or the flow activated output cut-off circuit 73 disposed at the output end of the compound electronic filter comprising a single stage filter 45, are controlled by a switch control circuit 74 receiving a command signal from the flow switch 75 in the same manner as that described in conjunction with FIG. 1. It should be understood that the flow switch 75 is disposed in the same flow passage including the combination of the vortex generating bluff body and the vortex sensing planar member. It is generally preferred to dispose the flow switch 75 downstream of the flow sensor. A vortex flowmeter having one of the three structural embodiments shown in FIG. 1 and employing the compound electronic filter shown in FIG. 2 with a flow activated output cut-off circuit easily measures air flows under the standard condition as low as 3 feet per second or 1 meter per second, and water flows as low as 0.2 feet per second or 0.07 meter per second without introducing any false readout throughout the entire range of the flow measurement.

Figure 3:
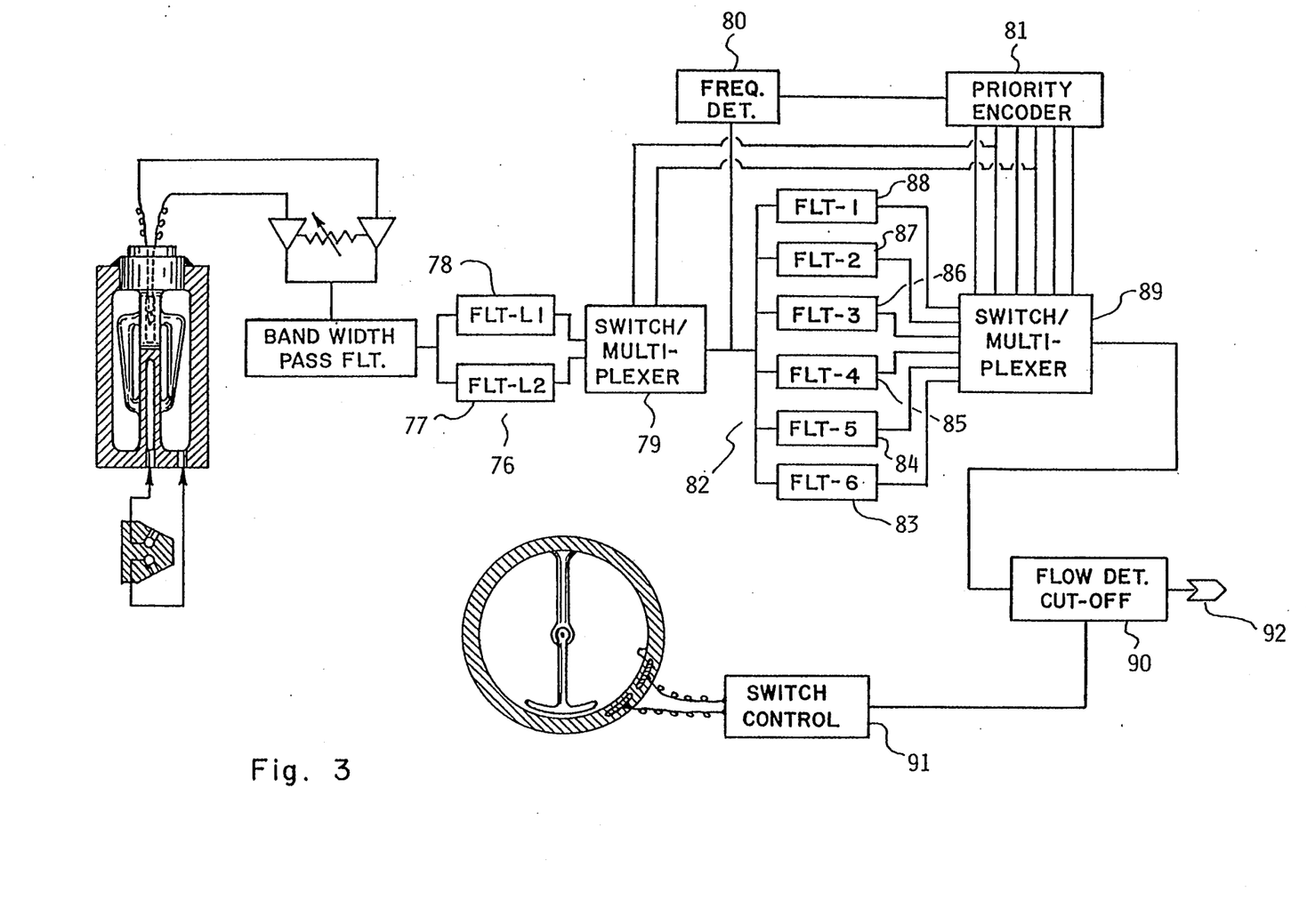
FIG. 3 illustrates a simplified and economized version of the electronic filter with the flow activated out-put cut-off switch shown in FIG. 2.

In FIG. 3 there is illustrated another embodiment of the compound electronic filter processing an alternating electrical signal representing the vortex shedding occurring in a vortex flowmeter or the rotation of a turbine or paddle included in a turbine or paddle flowmeter, which embodiment is a simplified and economized version of the embodiment shown in FIG. 2. In this particular illustrative embodiment, the first stage filter 76 equivalent to the first stage filter 45 shown in FIG. 1 includes only two band pass filters 77 and 78 respectively covering low and high frequency ranges of the vortex shedding frequencies, which band pass filters are controlled by a command signal generated by the combination of the switch/multiplexer 79, the frequency detector 80 detecting the frequency of the alternating electrical signal at the output end of the first stage filter 76, and the priority encoder 81 in the same manner as that controlling the low frequency band pass filters 47, 48, 49, etc. included in the first stage filter 45 shown in FIG. 2. The priority encoder 81 has a built-in control logic that automatically switches on one of the two band pass filters 77 and 78 when the other thereof is switched off, wherein the lowest frequency band pass filter 77 normally stays switched on when there is no detectable frequency of the output signal from the first stage filter 76. The second stage filter 82 equivalent to the second stage filter 46 shown in FIG. 2, that includes a plurality of band pass filters 83-88, etc. is controlled by the combination of the frequency detector 80 detecting the frequency of the alternating electrical signal at the output end of the first stage filter 76 and at the input end of the second stage filter 82, the priority encoder 81 and the switch/multiplexer 89 in the same manner as that controlling the second stage filter 46 shown in FIG. 2. A flow activated output cut-off circuit 90 controlled by a switch control circuit 91 cuts off the transmission of the output electrical signal representing the fluid velocity or flow rate from the compound electronic filter to an output terminal, when the fluid velocity U or flow rate of media being measured by the flowmeter is less than a preset threshold value, and establishes the transmission of the output electrical signal, when the fluid velocity U or flow rate of media is greater than the preset threshold value.

Figure 4:
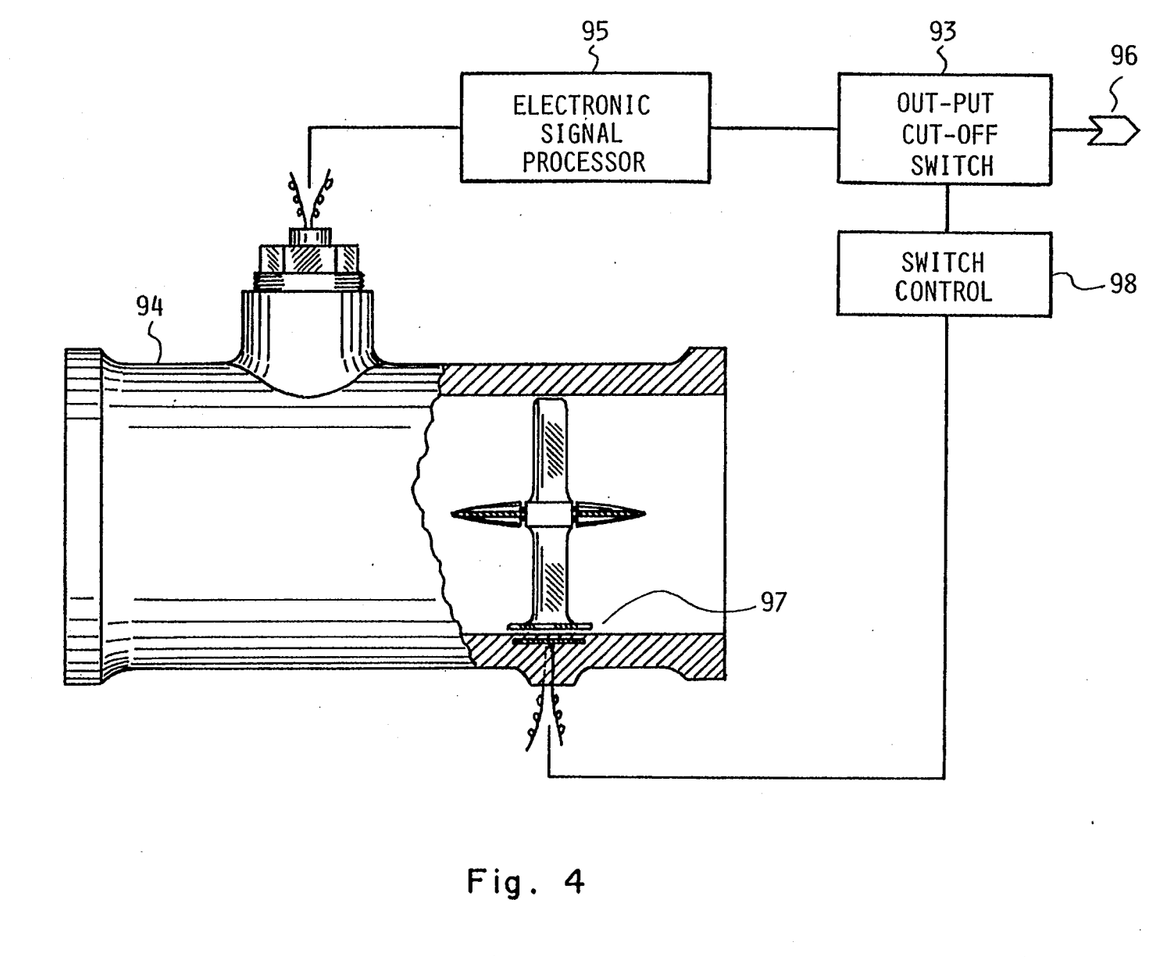
FIG. 4 illustrates an embodiment of one of various types of flowmeters mentioned in the afore-mentioned primary object of the present invention, that employs a flow activated out-put cut-off switch that switches on and off the transmission of the flow-generated electrical signal to an out-put terminal.

In FIG. 4 there is illustrated a block diagram that shows how a flow activated output cut-off circuit 93 cutting off the output electrical signal from any type of flowmeter 94, which may be a vortex flowmeter, turbine or paddle wheel flowmeter, differential pressure flowmeter, orifice or venturi flowmeter, Coriolis force or inertia force flowmeter, magnetic flowmeter, rotameter with an electronic readout device, a positive displacement flowmeter, or a thermal mass flowmeter, can be used to cut off the transmission of the flow-generated signal detected by a flowmeter 94 and processed by an electronic data processor 95 to an output terminal 96, when the fluid velocity U or flow rate of media being measured by the flowmeter 94 is less than a preset threshold value. A flow switch 97 disposed upstream or downstream of a flow sensor in the same flow passage provided by the flowmeter body provides a command signal that is amplified and put into a preferred form by a switch control circuit 98. When the fluid velocity U or flow rate of media being measured by the flowmeter 94 is less than a preset threshold value, the flow switch does not generate a command signal that makes the switch control circuit 98 to switch on the transmission of the flow signal to the output terminal 96 and, consequently, no output signal representing the flow rate is transmitted from the electronic signal processor 95 to the output terminal 96. When the fluid velocity U or flow rate of media is greater than the preset threshold value, the flow switch 97 generates a command signal that makes the switch control circuit 98 to switch on the transmission of the output signal from the electronic signal processor 95 to the output terminal 96 and, consequently, the flow signal generated by the flowmeter and processed by the electronic signal processor 95 is transmitted to the output terminal 96 as long as the fluid velocity U or flow rate of media being measured by the flowmeter 94 is greater than the preset threshold value. It should be understood that the flow switch 97 may be any one of the various embodiments shown in FIGS. 1 and 2, or of many other versions of the flow switches available at the present time or to become available in the future.

While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. A method for obtaining zero read-out from a flowmeter when actual flow rate of media being measured by the flowmeter is substantially equal to zero, comprising in combination:
   a) obtaining a primary electrical signal representing flow rate of media by using a main flowmeter and determining flow rate of media from the primary electrical signal;
   b) obtaining an auxiliary electrical signal by using an accessory flow sensor, and generating a command signal from the auxiliary electrical signal independent of the primary electrical signal for controlling switching on and off of a signal output switch; and
   c) controlling the transmission of the primary electrical signal to an output terminal by using the signal output switch that is controlled by the command signal generated from the auxiliary electrical signal independent of the primary electrical signal, wherein the command signal closes the signal output switch when a flow level sensed by the accessory flow sensor is equal to or greater than a preset threshold value, and opens the signal output switch when a flow level sensed by the accessory flow sensor is less than the preset threshold value.

2. A method as defined in claim 1 wherein the primary electrical signal comprises an alternating electrical signal generated by a vortex flowmeter.

3. A method as defined in claim 1 wherein the primary electrical signal comprises a fluctuating electrical signal generated by a rotating motion of a rotary member experiencing a fluid dynamic torque.

* * * * *